Nov. 17, 1936.  E. ROBERTS  2,060,827
WATER COOLED PULLEY FOR CENTRIFUGALS AND THE LIKE
Filed March 9, 1935
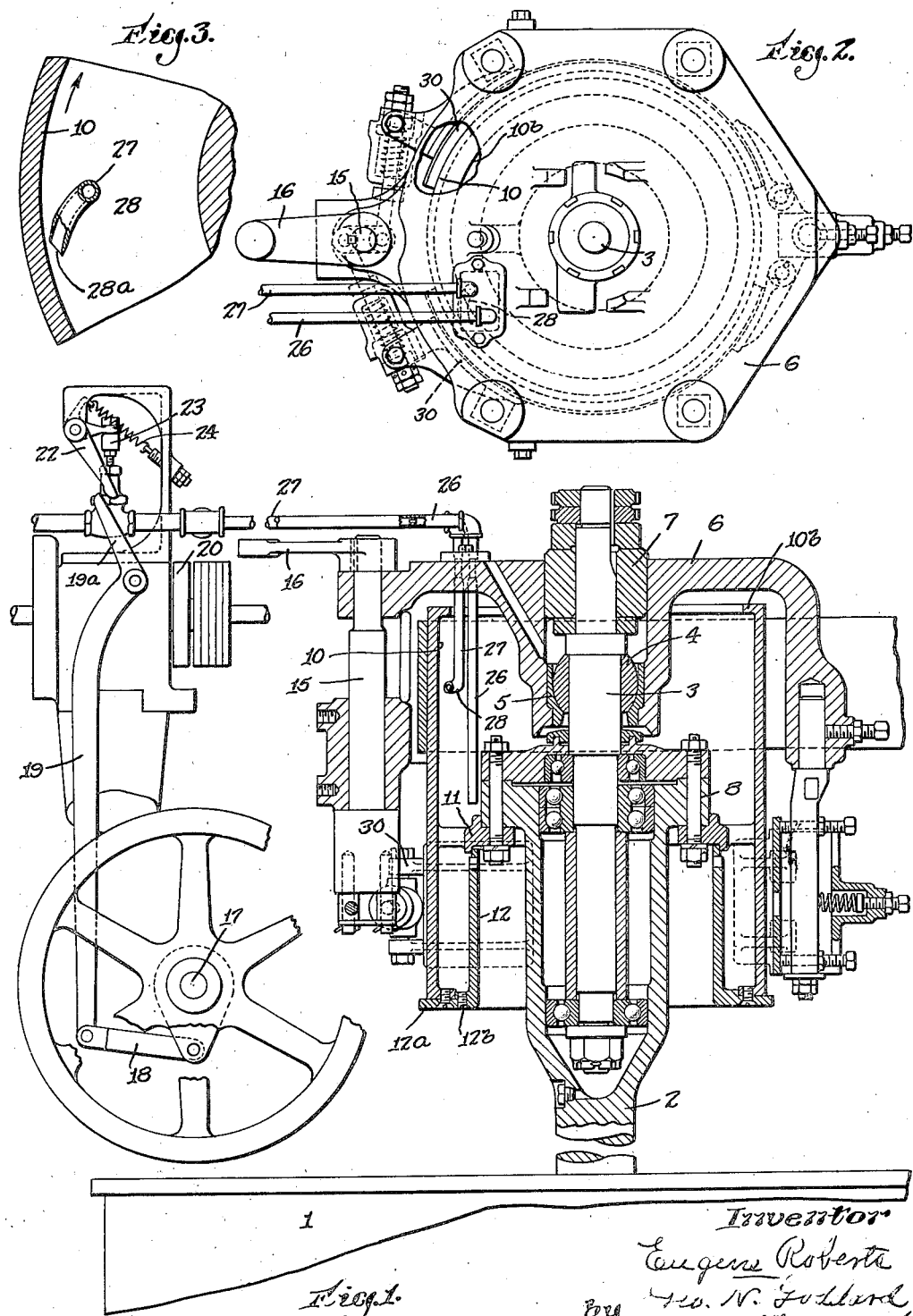

Patented Nov. 17, 1936

2,060,827

UNITED STATES PATENT OFFICE 2,060,827

WATER COOLED PULLEY FOR CENTRIFUGALS AND THE LIKE

Eugene Roberts, Hastings, N. Y., assignor to The Western States Machine Company, Salt Lake City, Utah, a corporation of Utah Application March 9, 1935, Serial No. 10,316

8 Claims. (Cl. 188—264)

This invention relates to a water cooled pulley construction particularly adapted to centrifugal or like machines in which the pulley is used as a drive transmitting and also as a braking element secured to the upper end of a rotary, gyratory suspended shaft.

Since it is highly desirable, if not essential in this class of machines, that the driving belt should engage the suspended shaft pulley in the equatorial plane of gyration of the shaft, it has been customary to use the same pulley for engagement with the stationary or non-revoluble brake elements of such a centrifugal. In some cases such brake elements were in the form of internally disposed brake shoes that were expanded against the inside surface of the brake. This however resulted in excessive heating of the brake where the belt was applied and the later practice has been along the line of securing to the belt pulley a downwardly extending brake pulley partly insulated from the belt pulley and being disposed inside external brake shoes or brake band as shown in my earlier Patent No. 1,882,037.

Even with this construction there was still excessive heating resulting in a destructive deterioration of both the driving belt and the brake linings.

The present invention is intended to provide a convenient and highly efficient arrangement for keeping the pulley cool enough to avoid any injury to either the belt or the brake lining and is effected by maintaining, while the machine is in normal operation, a constant circulation of cooling fluid against the interior face of the pulley periphery and so arranged as to prevent any spattering or splashing of the liquid when the machine is in operation or when it is being stopped by application of the brake.

With this object in view I have provided a single pulley, the upper portion of whose peripheral rim encircles the center of oscillation of the basket shaft and has a downward extension projecting far enough to lie in the plane of the brake, said pulley having intermediate of its ends a perforated or skeleton spider for securing it to the basket shaft while allowing circulation of the liquid and having also an interior wall spaced from the rim sufficiently to form a reservoir for retaining a portion of the cooling liquid when the machine stops, said pulley being combined with inlet and outlet pipes for the liquid to maintain the desired circulation so that there is no spilling of the liquid over the top of any portion of the pulley. This and other features of the invention will be particularly described in the following specification and will be defined in the claims hereto annexed.

In the drawing is illustrated a preferred form of construction embodying the principles of this invention, in which Fig. 1 is a vertical central section showing the suspension construction of a gyratory centrifugal and its water cooled pulley attached in conjunction with a showing, in elevation, of the shipper control mechanism by which the cooling liquid is admitted to the interior of the pulley by the movement of the controlling shipper mechanism and is automatically closed when the shipper mechanism returns to idle position.

Fig. 2 is a plan view of the apparatus shown in Fig. 1, the shipper mechanism being omitted.

Fig. 3 is a detail view in horizontal cross section showing a portion of the hanger and the pulley rim as viewed from a plane a short distance above the end of the outlet or draw-off pipe.

Sugar centrifugals today, according to the best practice heretofore prevailing, are operated at a speed of approximately 1200 R. P. M. on a complete cycle of approximately three minutes. Since the loaded centrifugal weighs about a ton it will be seen that the frequent and repeated stopping of this heavy revolving mass involves a tremendous generation of heat by the application of the brake, since the machine must be brought to rest in comparatively few seconds from its high speed revolution.

My present improvement completely eliminates this trouble by providing a construction and arrangement of pulley that maintains a constant circulation of cooling liquid from the time the machine is started in operation until the brake is applied, which is for much the greater part of the duration of the cycle of operation. In consequence it is possible to prevent the combined belt and brake pulley from attaining a temperature above 130° F., at which temperature there is no injurious reaction upon the brake lining or the belt from heat and consequently the loss of time and expense of replacement is largely eliminated, since both brake linings and belts will last indefinitely.

In the accompanying drawing I have shown a centrifugal suspension arrangement with its belt driving and braking pulley arranged in a general way somewhat similar to the disclosure of my earlier Patent No. 1,882,037, but in this case the cylindrical pulley rim is continuous or integral with a single intermediate supporting spider and carries an interior ring forming a cooling liquid chamber in the lower part of the pulley.

The pertinent parts of the centrifugal herein illustrated comprise the suspended centrifugal basket 1 of usual construction secured to the lower end of the gyratory vertical basket shaft 2 which, in this case, is mounted upon a series of thrust sustaining and radial ball bearing races from a short suspension spindle 3, to which is secured a spherically curved suspension ball 4 mounted in socketed bearing 5 of an overhead fixed hanger 6 provided with a deep central socket for carrying the suspending spindle and the yielding centralizing buffer 7.

The belt pulley comprises a cylindrical peripheral rim 10, whose upper portion surrounds the center of gyration, that is, the equatorial plane of gyration, and is provided intermediate of its ends with an inwardly projecting perforated or skeleton spider 11 by which it is bolted to the flanged upper end 8 of the basket shaft. To the lower end of the elongated pulley rim 10 is secured, by means of its lateral flange 12a, an inner annular wall 12 sufficiently spaced inward from the interior face of the rim 10 to form an annular reservoir for retaining a portion of the liquid when the machine stops. The openings in the spider 11 allow free circulation of the liquid along the whole interior face of the pulley rim 10.

A vertical brake actuating spindle 15 is rotatably supported in suitable bearings formed in the overhead suspension hanger 6 and at its upper end has a horizontal arm 16 by which it is suitably connected, by means not here shown, with the shipper shaft 17 which, by means of a connecting link 18 and a timer controlling lever 19, controls the clutch, not shown, of the timer mechanism 20 by which the steps in the cycle are timed in a well known manner. The timer control lever 19 has an upward extension 19a arranged to actuate a crank arm lever 22, whose horizontal member engages the valve stem 23, which is normally pushed down to closed position by the tension spring 24 but is rocked in a clockwise direction when the shipper shaft is thrown to active position so that the valve actuating lever 22 is rotated in a counterclockwise direction to open the valve and keep it open until the shipper mechanism is released and the brake is applied.

Since the details of this mechanism are shown in other patents and they form no part of the present invention further details of this construction are unnecessary. It will suffice to state that the particular mechanism, by which the valve is opened at the starting of the machine and closed when the power is thrown off and the brake applied, may be varied to effect the coordination of the liquid supply and cut-off valve with the actuating mechanism of the centrifugal or other suspended machine.

The liquid supply pipe 26 has its delivery end carried down through the upper portion of the hanger 6 to deliver the cooling liquid at a point above the spider 11, so that the liquid, due to the centrifugal force caused by the rotation of the pulley, will spread in a thin film over the inside face of the pulley rim and naturally the hotter liquid tends to rise toward the inturned lip 10b at the upper end of the pulley.

Constant circulation of the liquid, while the machine is operating, is maintained by providing an outlet pipe 27 which also projects down through the open top of the pulley and terminates in a horizontal intake nozzle 28, which is arranged in the equatorial plane of oscillation, that is, on a level with the center of oscillation, and which has an intake nozzle whose intake end is cut off obliquely to the intersecting radius of the pulley at that point and is brought as close as practicable to the inside wall of the pulley rim 10 at the equatorial plane of gyration. Not only is the receiving end of this nozzle oblique, as shown at 28a, but the inner and outer sides of the nozzle are bevelled off to a sharp edge to avoid splashing the liquid. Since the machine is assumed to rotate in a clockwise direction, as illustrated in Fig. 3, the sharp forward edge of the receiving nozzle cuts cleanly into the revolving film of fluid which flows smoothly through the nozzle and up through the offtake pipe 27, either to a cooling supply tank or to a waste pipe. As the cooler portion of the liquid is heavier than the heated liquid, the action of centrifugal force is to maintain a film of cool liquid in contact with the pulley, while the heated portion is withdrawn, and the offtake nozzle is so close to the pulley that it is not possible for any heated body of liquid to remain in contact with the pulley rim. Furthermore, as this offtake nozzle is located in the equatorial plane of oscillation there is no danger of the oscillating pulley striking against the offtake nozzle and causing breakage.

What I claim is:

1. A water cooled pulley construction for driving and braking a gyratory suspended shaft for a centrifugal or the like, embracing in its construction a peripheral rim whose belt-engaging portion encircles the shaft at its center of gyration and whose brake-engaging portion forms an extension thereof, and an intermediate inwardly projecting spider for connecting the rim to the shaft and provided with openings for permitting the flow of cooling liquid over the inside face of both portions of said rim, a fixed liquid supply pipe whose delivery end is located inside said pulley to supply cooling liquid thereto, and an offtake pipe whose open intake end is located inside said pulley and positioned to collect the liquid from the inside of the pulley and conduct it therefrom, thereby maintaining continuous circulation of a cooling fluid when the centrifugal is in operation.

2. A water cooled pulley construction for driving and braking a gyratory suspended shaft for a centrifugal or the like, embracing in its construction a peripheral rim whose belt-engaging portion encircles the shaft at its center of gyration and whose brake-engaging portion forms an extension thereof, and an intermediate inwardly projecting spider for connecting the rim to the shaft and provided with openings for permitting the flow of cooling liquid over the inside face of both portions of said rim, a fixed liquid supply pipe whose delivery end is located inside said pulley to supply cooling liquid thereto, an offtake pipe whose intake end is located inside said pulley and positioned to collect the liquid from the inside of the pulley and conduct it therefrom, thereby maintaining continuous circulation of a cooling fluid when the centrifugal is in operation, and an inner annular wall spaced from and secured to the lower end of the pulley rim to provide a retaining receptacle for liquid when the pulley ceases to rotate.

3. The combination with a combined braking and driving pulley comprising a belt-engaging and brake-engaging peripheral rim having an intermediate supporting spider for securing it to a vertical revoluble and gyratory suspended shaft, means for preventing the escape of liquid through the bottom of the pulley, a fixed supply pipe whose delivery end is located inside said pulley, and an offtake pipe arranged with its liquid intake end inside the pulley rim at substantially the level of the equatorial plane of the center of gyration of the shaft.

4. In an apparatus of the class described, the combination with a cylindrical continuous pulley rim comprising belt-engaging and brake-engaging zones, the former encircling the equatorial plane of a gyratory rotary shaft, means comprising an upwardly flanged inner annular member secured to the bottom portion of the pulley rim and inwardly spaced therefrom, an inward supporting spider intermediate the ends of said pulley rim for securing the pulley to a gyratory rotary shaft, means for maintaining a continuous circulation of cooling liquid against the inside face of said pulley comprising a supply pipe arranged to deliver liquid inside said pulley rim, and an offtake pipe having an intake nozzle arranged inside the pulley and adjacent to the rim thereof whereby an interior annular film of cooling liquid is maintained against the inside face of said pulley to a predetermined thickness when normally rotating, while allowing said liquid to flow into the bottom of the pulley when the pulley ceases rotation.

5. The combination of a combined belt driven and braking pulley comprising an annular rim secured to a central gyratory shaft by an interior spider having openings adjacent the rim for the flow of liquid inside the rim, means for supplying a cooling liquid to the interior of the pulley, and an offtake pipe having an intake nozzle inside said pulley at a predetermined distance from the rim thereof to carry away the excess of liquid beyond a predetermined amount, thereby preventing the spilling of liquid from either end of the pulley.

6. A brake pulley means for maintaining a film of cooling liquid inside the rim of said pulley attached to a gyratory suspended centrifugal shaft comprising a fixed inlet pipe having its delivery end located inside said pulley rim, an offtake pipe having an intake nozzle located in the equatorial plane of gyration of said pulley, said nozzle extending out in close proximity to the inside face of said rim at said plane and having the edge of its intake end extending obliquely to the intersecting radius of the pulley.

7. Means maintaining a circulation of cooling liquid inside the rim of a combined belt and braking pulley attached to a gyratory suspended centrifugal shaft comprising a fixed inlet pipe having its delivery end located inside said pulley rim, an offtake pipe having an intake nozzle located in the equatorial plane of gyration of said pulley, said nozzle extending out in close proximity to the inside face of said rim at said plane and having the edge of its intake end extending obliquely to the intersecting radius of the pulley and also having the oblique end edge of said nozzle bevelled to a thin edge.

8. A water cooled pulley construction for a suspended gyratory centrifugal shaft embracing in combination a pulley having a cylindrical rim and an interior attaching spider for securing it to said gyratory shaft, a valved liquid supply pipe for supplying cooling liquid to the interior face of the pulley rim, an offtake pipe whose open intake end extends in a direction opposite to the direction of revolution of the pulley and is located adjacent the interior face of the pulley at approximately the level of the center of gyration of the centrifugal shaft whereby a thin film of liquid may be maintained over the inner face of the pulley rim while the machine is in normal operation.

EUGENE ROBERTS.